US009932111B2

(12) United States Patent
Spinelli (10) Patent No.: US 9,932,111 B2
(45) Date of Patent: Apr. 3, 2018

(54) METHODS AND SYSTEMS FOR ASSESSING AN EMERGENCY SITUATION (71) Applicant: The Boeing Company, Chicago, IL (US)

(72) Inventor: Charles Spinelli, Anthem, AZ (US)

(73) Assignee: THE BOEING COMPANY, Chicago, IL (US)

( * ) Notice: Subject to any disclaimer, the term of this patent is extended or adjusted under 35 U.S.C. 154(b) by 110 days.

(21) Appl. No.: 15/009,829

(22) Filed: Jan. 29, 2016

(65) Prior Publication Data

US 2017/0217588 A1 Aug. 3, 2017

(51) Int. Cl.
*B64C 39/02* (2006.01)
*G08G 5/00* (2006.01)
*G05D 1/00* (2006.01)
*G06K 9/00* (2006.01)
*H04L 29/08* (2006.01)

(52) U.S. Cl.
CPC ......... *B64C 39/024* (2013.01); *G05D 1/0055* (2013.01); *G05D 1/0088* (2013.01); *G06K 9/00771* (2013.01); *G08G 5/0013* (2013.01); *G08G 5/0056* (2013.01); *G08G 5/0069* (2013.01); *G08G 5/0086* (2013.01); *G08G 5/0091* (2013.01); *B64C 2201/021* (2013.01); *B64C 2201/104* (2013.01); *B64C 2201/108* (2013.01); *B64C 2201/12* (2013.01); *B64C 2201/123* (2013.01); *B64C 2201/141* (2013.01); *B64C 2201/162* (2013.01); *H04L 67/12* (2013.01)

(58) Field of Classification Search
CPC .............. B64C 39/024; B64C 2201/12; B64C 2201/141; G08G 5/0056; G08G 5/0069; G08G 5/0091; G05D 1/0055; G05D 1/0088; H04L 67/12
USPC ........................................................ 701/1, 4
See application file for complete search history.

(56) References Cited

U.S. PATENT DOCUMENTS

| 9,213,934 | B1 * | 12/2015 | Versteeg | G06N 3/004 |
|---|---|---|---|---|
| 9,359,067 | B2 * | 6/2016 | Fucke | B64C 19/00 |
| 2011/0216200 | A1 * | 9/2011 | Chung | B61L 15/0027 348/148 |
| 2015/0355639 | A1 * | 12/2015 | Versteeg | G06N 3/004 700/246 |
| 2016/0046308 | A1 * | 2/2016 | Chung | B61L 25/025 701/20 |
| 2016/0093212 | A1 * | 3/2016 | Barfield, Jr. | H04N 7/185 348/144 |

(Continued)

*Primary Examiner* — Jaime Figueroa
(74) *Attorney, Agent, or Firm* — McDonnell Boehnen Hulbert & Berghoff LLP (57) ABSTRACT

A method and system for assessing a situation using an unmanned vehicle is disclosed. An unmanned vehicle receives a transmission indicating a situation at a designated location, and then navigates to the designated location. The unmanned vehicle may reach the designated location via air or ground travel, or a combination thereof. The unmanned vehicle receives signals from a first subset of sensors indicating information concerning an environment at the designated location and from a second subset of sensors indicating information concerning one or more objects associated with the situation. The unmanned vehicle then sends one or more transmissions based on the received signals, facilitating rapid determination of the situation.

20 Claims, 7 Drawing Sheets

(56) References Cited

U.S. PATENT DOCUMENTS

| | | | |
|---|---|---|---|
| 2017/0113799 A1* | 4/2017 | Kovac | B64C 39/024 |
| 2017/0124476 A1* | 5/2017 | Levinson | G05D 1/0088 |
| 2017/0124885 A1* | 5/2017 | Patterson | G08G 5/0069 |
| 2017/0126810 A1* | 5/2017 | Kentley | H04L 67/125 |
| 2017/0176991 A1* | 6/2017 | Hoskeri | G05D 1/0088 |
| 2017/0185089 A1* | 6/2017 | Mei | G05D 1/0257 |

\* cited by examiner

METHODS AND SYSTEMS FOR ASSESSING AN EMERGENCY SITUATION

BACKGROUND

Unless otherwise indicated herein, the materials described in this section are not prior art to the claims and are not admitted to be prior art by inclusion in this section.

At the scene of an emergency situation, timely assessment and evaluation of the scene is critical. The safety and efficiency of operations during cleanup is heavily dependent upon condition assessment, the extent of any damage, and safety to life and property. In such situations there is typically an urgency to determine the conditions of the situation so that aid can be provided to those in need and the scene can be properly managed and contained.

Generally, support personnel are deployed to assess conditions after the occurrence of an event causing the emergency situation, exposing the personnel to risk due to unknown conditions, and thus unknown hazards.

BRIEF SUMMARY

Methods and systems for assessing a situation using an unmanned vehicle are disclosed. In an example embodiment, a method includes receiving a transmission indicating a situation at a designated location and navigating to the designated location. The method then includes receiving signals from a first subset of sensors indicating information concerning an environment at the designated location, receiving signals from a second subset of sensors indicating information concerning one or more objects associated with the situation, and issuing one or more transmissions based on the received signals from the first subset of sensors and the second subset of sensors.

In another example embodiment, an unmanned vehicle for assessing a situation is provided. The unmanned vehicle includes at least one propulsion unit, a first wing, a second wing, and a plurality of wheels connected to a body. The unmanned vehicle also comprises a navigation module that provides a navigation process to generate flight-control signals for the unmanned vehicle, one or more sensor systems connected to the body, and a non-transitory computer readable medium having stored therein instructions executable to cause the unmanned vehicle to: (i) receive a transmission indicating a situation at a designated location; (ii) navigate from a launch site to the designated location; (iii) receive signals from a first subset of sensors indicating information concerning an environment at the designated location; (iv) receive signals from a second subset of sensors indicating information concerning one or more objects associated with the situation; and (v) issue one or more transmissions based on the received signals from the first subset of sensors and the second subset of sensors.

In yet another example embodiment, a method for assessing conditions caused by a train accident using an unmanned vehicle is provided. The method includes receiving a transmission indicating a train accident at a designated location, navigating to the designated location, receiving signals from a first subset of sensors indicating information concerning an environment at the designated location, receiving signals from a second subset of sensors indicating information concerning one or more objects associated with the situation, and issuing one or more transmissions based on the received signals from the first subset of sensors and the second subset of sensors.

The features, functions, and advantages can be achieved independently in various embodiments of the present disclosure or may be combined in yet other embodiments in which further details can be seen with reference to the following description and drawings.

DETAILED DESCRIPTION

1. Overview

Embodiments described herein may be implemented in methods and systems in which an unmanned vehicle is configured to rapidly deploy to and provide assessment of a situation. Providing autonomous assessment of a situation allows for more efficient containment of the situation and more efficient use of cleanup and emergency resources. Autonomous assessment also provides a safety benefit to personnel, preventing personnel from being put in the way of unknown dangers during the initial situation assessment phase.

An example embodiment provides an unmanned vehicle, configured for both autonomous aerial and ground transportation, comprising on-board sensors for collection of data of a situation, as well as a communication system to report the collected data. Additionally, autonomous on-board processing capabilities may be present on the vehicle to assist in assessing a situation from the collected data.

In one example embodiment, a situation involves a train accident, and may include derailment of one or more train cars. However, the term "situation" as used herein should be understood to include any situation to which government or a private entity might dispatch its personnel. For example, an emergency situation to which a police car, fire truck, or ambulance might be dispatched may be considered a situation for purposes of this disclosure. Some non-emergency situations may also be considered a situation for purposes of this disclosure; for example, monitoring a moving train or a portion of a train track to provide an accurate account of the conditions along the track and to ensure a safe environment for operation.

Embodiments of the example system support a number of functions. One function is assessment of an environment at the scene of a situation. Assessment of an environment may include determining a wind speed and profile and other weather conditions, mapping a terrain, and mapping potential points of access to aid with the situation for personnel. Another function is determining whether chemical or hazardous substances are present at the scene of an accident, and the extent of any leaks of such substances. Yet another function is detection and identification of vehicles and vehicle components, and the extent of any damage to such components. In one example embodiment wherein the situation is a train derailment, orientation of railcars, contents within the railcars, and extent of damage of the railcars, for example, may all be evaluated as part of the detection and identification process. Data concerning such items allows a decision support team to determine a safe route for personnel to approach a situation, contain the situation, and evacuate surrounding areas that may be affected by the situation.

Thus, embodiments described herein may reduce the high cost and risk to personnel for cleanup and containment of a situation. Embodiments described herein may also contribute to the efficiency of cleanup operations in order to resume business operations at the scene of the situation, which is important to minimize negative impact on revenue.

2. Example Vehicle

Figure 1:
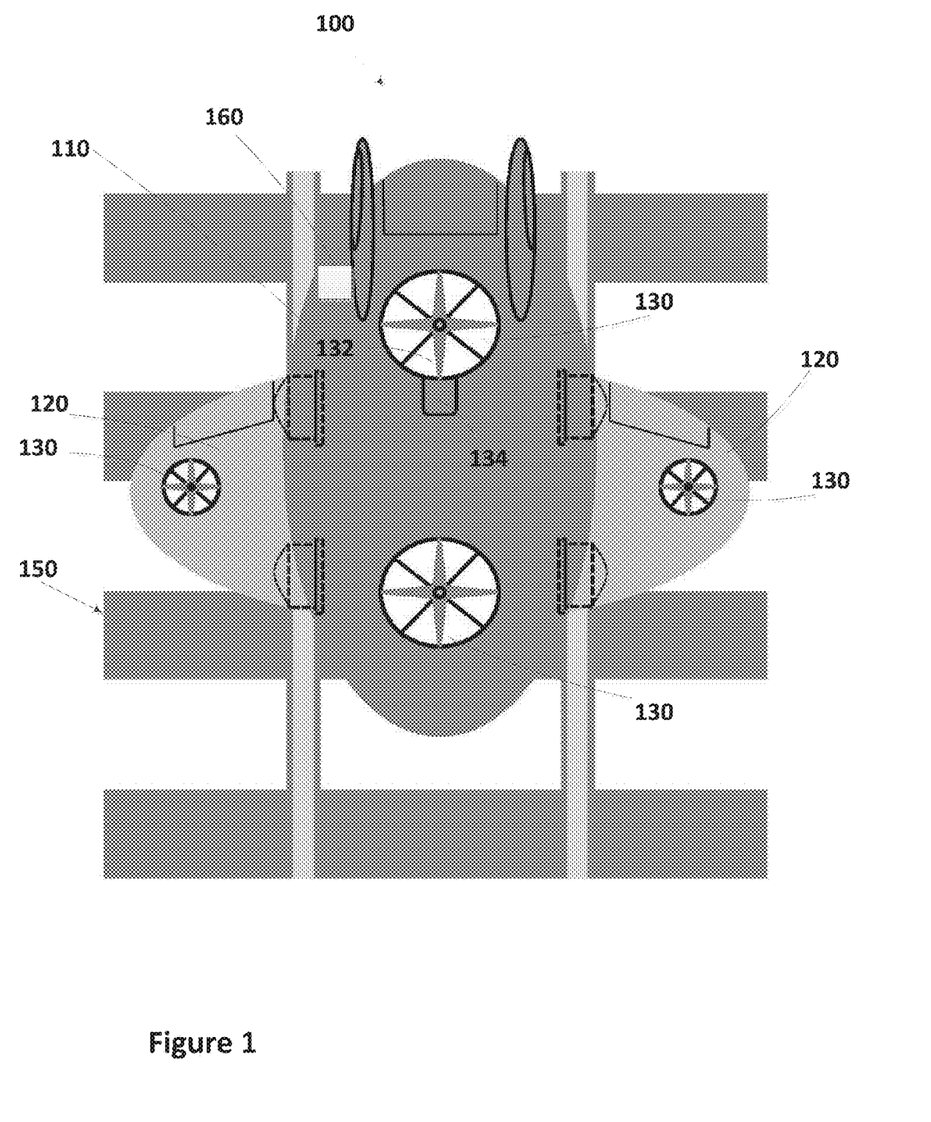
FIG. 1 is a diagrammatic representation of a vehicle in accordance with an exemplary embodiment.

FIG. 1 is a diagrammatic representation of a vehicle 100 in accordance with an exemplary embodiment. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Vehicle 100 may be an unmanned vehicle. The term "unmanned vehicle" as used in this disclosure refers to any autonomous or semi-autonomous vehicle that is capable of performing some functions without a physically present human pilot.

Vehicle 100 may be capable of aerial and ground movement. Vehicle 100 may have the capability to fly over a situation, for example, a situation involving railroad infrastructure, as well as to land on a train track of the railroad infrastructure and move on the train track for closer inspection. In another example, vehicle 100 may have the capability to land on the ground and inspect tunnels, under bridges or other crossings, as well as to drive across rocky or hilly terrain.

Vehicle 100 incorporates a fuselage 110 and wings 120. A propulsion system such as motorized propellers 130 or possibly a small jet engine provides thrust for operation. Vehicle 100 further includes a plurality of sensors (shown as sensors 140 in FIGS. 2b and 4). In FIG. 1, vehicle 100 is shown on a train track 150. Vehicle 100 may be configured with wheels that are sized and spaced apart to ride on a standard train track.

Wings 120 provide a lift to vehicle 100, and may take various forms in various embodiments.

Propellers 130 include a rotatable propeller unit 132 that is rotatably connected to a side of fuselage 110 via a rotatable connection 134. The propulsion system may be powered by a fuel, which may be stored in fuselage 110 and delivered to the propulsion unit via one or more fluid conduits, such as piping. In alternative example embodiments, the propulsion unit may be battery powered, wherein one or more batteries are located within fuselage 110 and are connected to the propulsion unit via one or more electrical connections, such as wires or wireless interfaces.

A first subset of the plurality of sensors detects various data concerning the environment. Data concerning the environment may include, but are not limited to, weather conditions such as temperature, wind speed and profile, terrain, e.g., geographic features on the ground, including subtle geographic features such as river terraces, small hills and valleys in the ground, and potential obstacles. Potential obstacles may include any physical feature that would stand in the way of, hinder, or slow down personnel or vehicles from accessing a desired location. The first subset of the plurality of sensors may include Lidar technology, whereby distance from the sensor to a target is measured by illuminating the target with a laser and analyzing the reflected light. The first subset of the plurality of sensors may also include a sensor module comprising a Global Positioning System (GPS) receiver, an inertial measurement unit, an altimeter, camera system, radar, and a proximity detection system.

A second subset of the plurality of sensors detects and identifies objects associated with the situation. In the example of a train derailment, the second subset of sensors may be used to communicate with a control system to identify which railcars are derailed, the orientation of the railcars, and aid in determination of the contents of the railcars. The second subset of sensor modules may include a sensor module comprising on-board image processing and detection capabilities, an imaging system, an automatic equipment identification system, a hot wheel and bearing detection system, and a railcar visible identification reader. Examples of sensors that may be used for railcar identification include visible sensors, infrared sensors, automatic equipment identification (AEI RF) readers, multi-spectral sensors, and Lidar sensors, among others. Examples of sensors that may be used to determine railcar orientation include Lidar sensors, visible sensors, infrared sensors, and multi-spectral sensors, among others. The exterior surface of a railcar typically contains an identification number or code. Upon detection of the identification number or code, the sensors relay signals indicating the data to a control system, which may then look up the contents slotted to be within that railcar.

A third subset of the plurality of sensors is configured to detect chemical or hazardous substances, providing notification regarding leakage of any such substances from a container into the environment. The third subset of the plurality of sensors serve the purpose of identifying, characterizing, quantifying, and/or mapping the existence and extent of a chemical or hazardous substance across a region. The chemical or hazardous substance may include a leak of such a substance from a container. Hazardous substances may include, for example, substances capable of burning or causing a fire, corrosive substances, reactive substances that are able to explode, toxic substances, or substances that produce toxic gases that are poisonous to people. In one example embodiment, multispectral sensors may be used as the third subset of the plurality of sensors. Multispectral sensors digitally collect reflectance or emittance energy levels in the electromagnetic spectrum (EMS), often in bands that are beyond aerial photographic capabilities. Example multispectral sensors include a Landsat MultiSpectral Scanner (MSS) and Thematic Mapper (TM). A hazardous substance can then be identified based on spectral differences from the surrounding environment.

Additionally, vehicle 100 may be tasked to deploy to a situation, such as a situation detected by a defect detector on a railroad. In one example, an on-track IR sensor may be used to monitor train components as trains pass over the sensor. When a problem is detected, the IR sensor may send a communication that is received by vehicle 100, and vehicle 100 may then be deployed to and navigate to the location of the train in question.

Additionally, vehicle 100 may comprise one or more cameras 160 that can be directed to point, focus, and zoom on a targeted location. Images obtained from cameras 160 may be used and combined with the data obtained from sensors to provide images overlaid with the data to aid and facilitate with access to and clean-up of a situation.

Figure 2A:
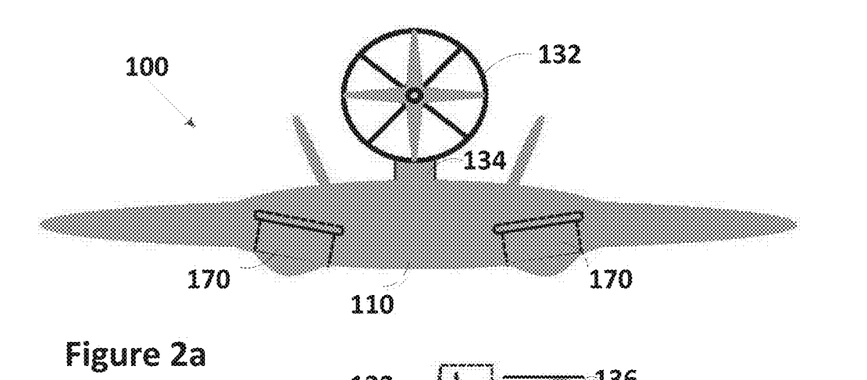
FIGS. 2a-2c are each a diagrammatic representation of the vehicle according to the embodiment of FIG. 1.
Figure 2B:
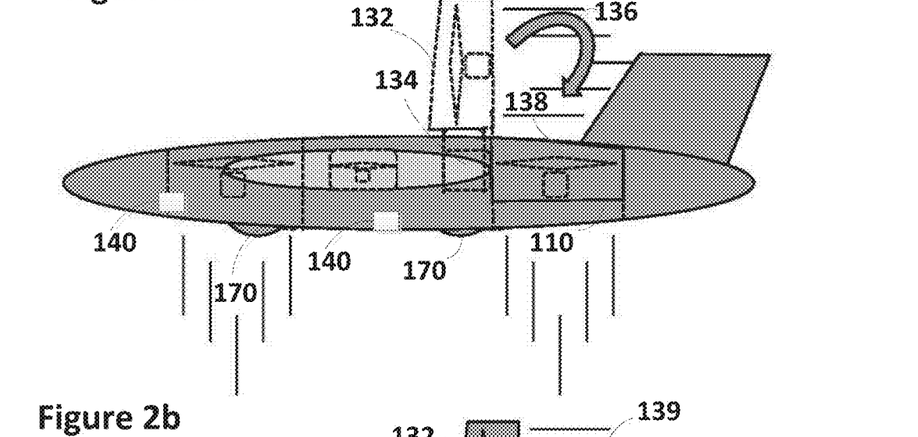
Figure 2C:
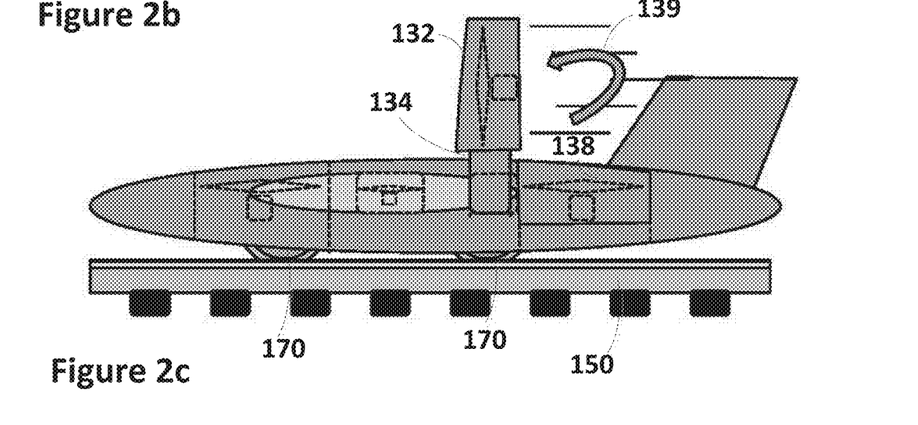

FIGS. 2a-2c are each a diagrammatic representation of the vehicle 100 according to the embodiment of FIG. 1.

FIG. 2a is a rear view of the vehicle 100 in an aerial or in-flight configuration, wherein wheels 170 of the vehicle are lifted and positioned within compartments of the fuselage 110 of the vehicle 100. The rotatable propeller unit 132 is in the upright position.

FIG. 2b is a side view of the vehicle 100, in a transitional configuration with the vehicle transitioning from the aerial configuration of FIG. 2a to a grounded configuration. To transition the vehicle 100, the rotatable propeller unit 132 is rotated in the direction of arrow 136, via the rotatable connection 134, into a compartment 138 within a side of fuselage 110. The wheels 170 begin to descend from their respective compartments. Example sensors 140 are shown near or at the bottom of the fuselage 110; however, sensors 140 may be provided in a number of locations on the vehicle 100.

FIG. 2c depicts a side view of the vehicle 100 in a grounded position on the train track 150. As shown in FIG. 2c, wheels 170 are aligned with the train track 150 to allow for movement of the vehicle 100 along the track. Additionally, the rotatable propeller 132 is rotated, via the rotatable connection 134, to exit the compartment 138 and continue to move in the direction of arrow 139 to resume an upright position and facilitate forward movement of the vehicle along train track 150. The configuration shown in FIG. 2c also allows for other ground transportation, such as on a road or other ground terrain.

Figure 3:
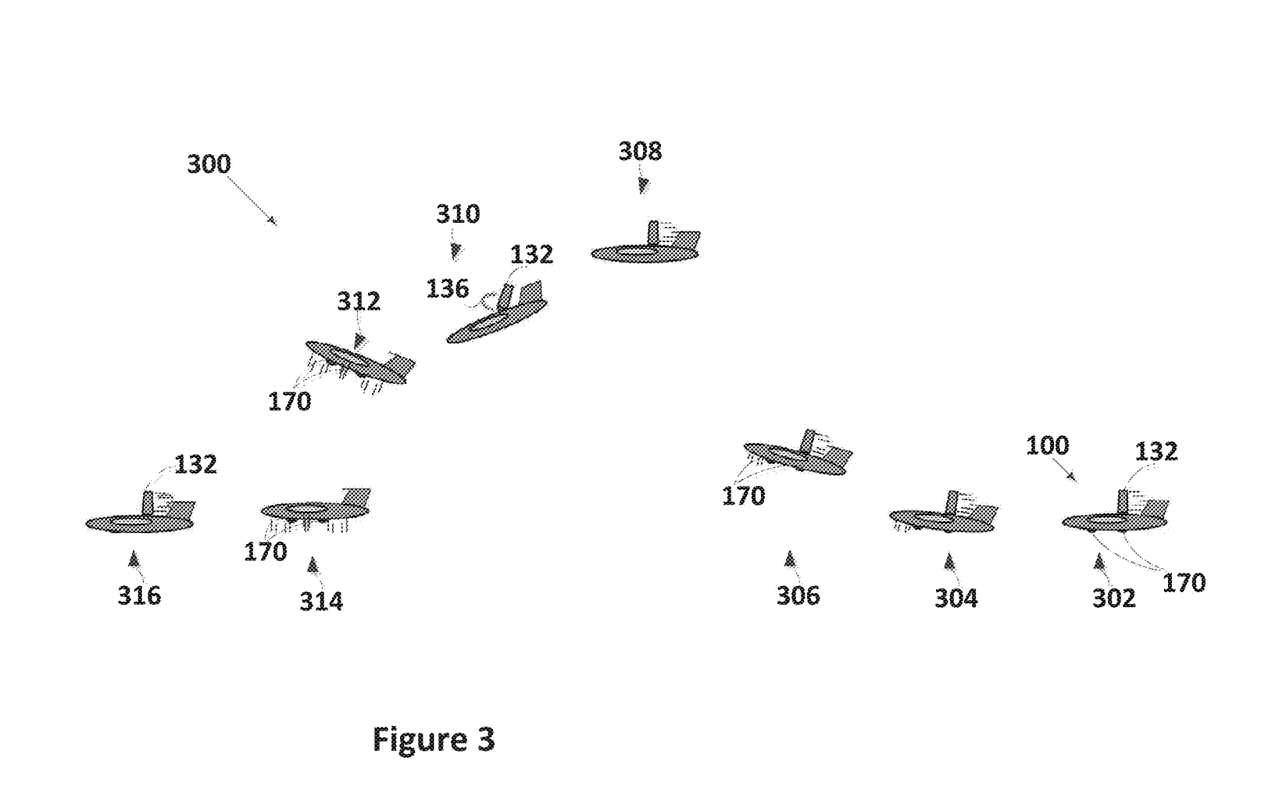
FIG. 3 is an example depicting a diagrammatic representation of the vehicle according to the embodiment of FIG. 1 in a series of flight positions.

FIG. 3 is an example 300 depicting a diagrammatic representation of the vehicle 100 according to the embodiment of FIG. 1 in a series of flight positions. For illustrative purposes, example 300 is described in a series of steps. Example 300 could be carried out in any number of steps, however.

Example 300 begins at step 302 in a take-off in position, wherein the vehicle 100 is on the ground. In some example embodiments, the ground may be a train track. In other example embodiments, the ground may be a terrain such as soil or rock. In yet another example embodiment, the ground may be a road. The ground may be flat or sloped. The vehicle 100 may be configured to takeoff in various types of environments, such as an urban or a rural environment. At step 302, rotatable propeller 132 is in the upright position and the wheels are descended from vehicle 100. The vehicle 100 is substantially parallel to the ground. The positioning of rotatable propeller 132, wheels 170, and wings 120 on the unmanned vehicle 100 may be controlled by a control system including one or more processors.

The vehicle 100 then begins ascent, shown at steps 304 and 306, wherein wheels 170 are lifted and stored away in compartments as described above with reference to FIG. 2a.

Example 300 continues at step 308 with the vehicle 100 in horizontal flight. During horizontal flight, the vehicle 100 may obtain various data from an environment, via sensors such as sensors 140. Horizontal flight may include flight between altitudes of 400 feet (ft) above ground level to about 3000 ft above ground level, for example, allowing for high speed inspection.

The vehicle 100 then begins its descent at step 310, rotating the rotatable propeller unit 132 in the direction shown by arrow 136 and described in further detail with reference to FIG. 2b.

At steps 312 and 314, vehicle 100 lowers wheels 170 to land, and may remain in a hovering position, shown at step 314, for an extended period of time, and may not transition to touch ground as described at step 314 below. Various subsets of the sensors may collect data in the hovering position of step 314.

Step 316 depicts the vehicle 100 landing on the ground. To facilitate ground movement, rotatable propeller unit 132 rotates via rotatable connection 134 to resume an upright position.

Vehicle 100 may thus be deployed upon receipt of a transmission indicating a situation at a designated location, and may take off and land as shown in the steps provided by example 300. At steps such as step 308, step 314, and step 316, for example, sensors may obtain data concerning the situation.

Figure 4A:
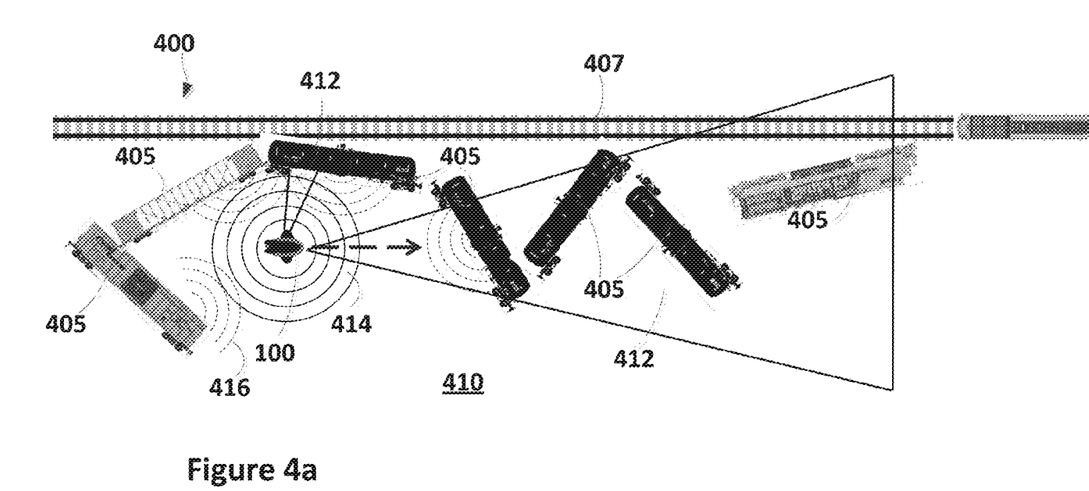
FIGS. 4a-4b are diagrammatic representations of the vehicle according to the embodiment of FIG. 1, at the scene of a situation.
Figure 4B:
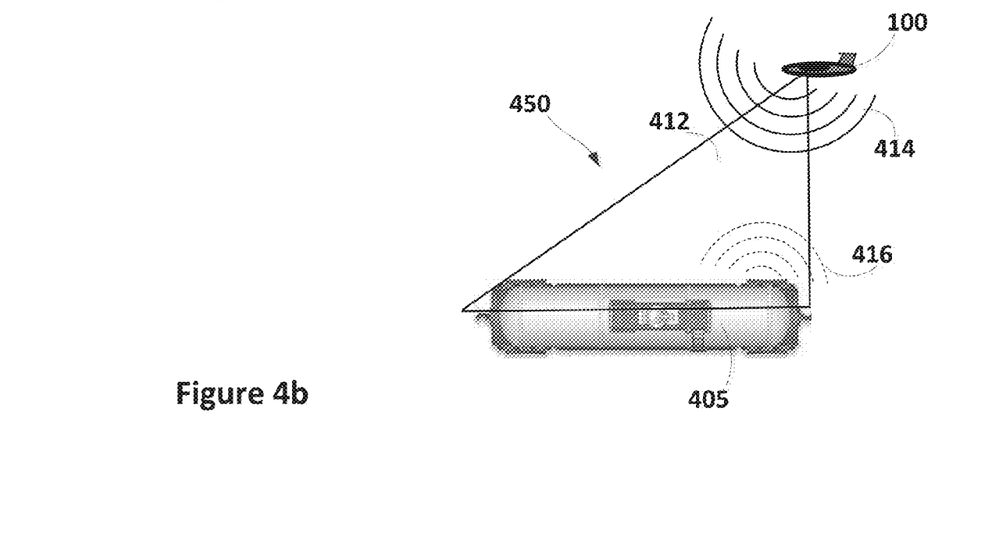

FIGS. 4a and 4b are diagrammatic representations 400 and 450 of vehicle 100, according to the embodiment of FIG. 1, at the scene of a situation. In the example depicted in FIGS. 4a and 4b, the situation is a train accident, wherein train cars 405 have derailed off train track 407, at a location 410. Vehicle 100 may deploy to location 410 upon receipt of a transmission indicating the train accident, launching and flying in accordance with the process described with reference to FIG. 3.

One of the sensors 140 on vehicle 100 projects a coverage area 412. The coverage area 412 may comprise an area for capturing images or video, for example. Another of the sensors 140 projects a signal 414 to communicate with information present on one or more railcars 405, for example, the sensor 140 may transmit AEI RF interrogations and listen for any replies from the railcar. Transponders on the railcars receive the interrogations, and may submit a response 416. The data obtained by the vehicle 100 may include a railcar number, load limit, empty weight of the railcar, water capacity, tank test and safety valve test information, railcar specification, commodity name, and special permit number, for example. Other data may be obtained as well.

Figure 5:
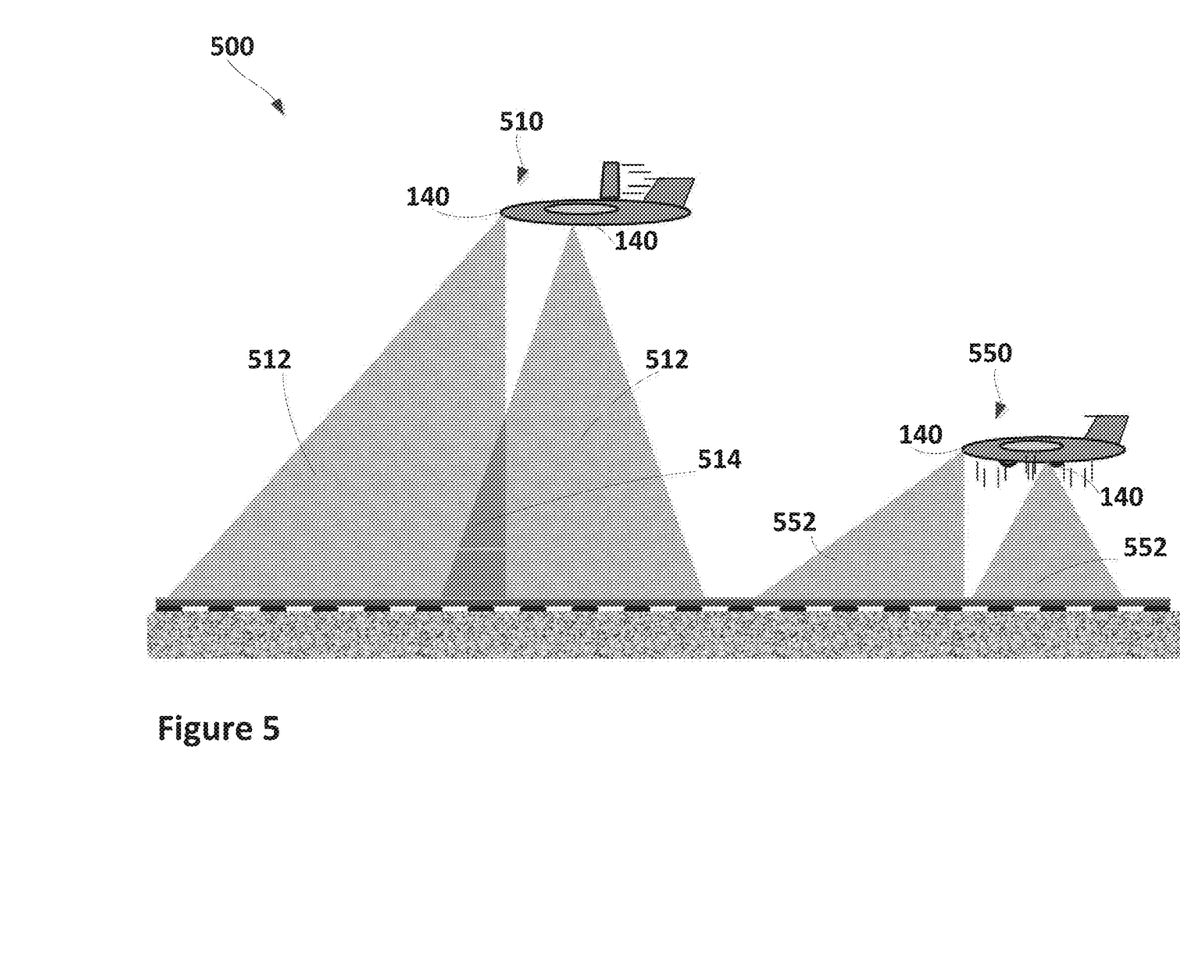
FIG. 5 is a diagrammatic representation of the vehicle according to the embodiment of FIG. 1 in different flight scenarios.

FIG. 5 is a diagrammatic representation 500 of vehicle 100, according to the embodiment of FIG. 1, in different flight scenarios.

In a high flight scenario 510, the vehicle 100 is in a horizontal flight position as described above with reference to step 308 of FIG. 3. The term "high flight" as used herein comprises a flight altitude of about 1000 ft above ground level or higher. Speeds at high flight are generally within a range that enables the sensors to collect data in an efficient and safe manner; example speeds may be speeds within the range of about 0 to 250 knots, depending on the altitude of the vehicle 100. Sensors 140, used to collect data and assess a situation in a high flight scenario 510, project coverage areas 512. Data may be collected by the sensor for the areas represented by coverage areas 512. As shown in FIG. 5, overlaps between sensor coverage areas 514 may occur in the high flight scenario 510.

In a low flight scenario 550, the vehicle 100 may be in a hovering or low flight position, as described with reference to step 314 in FIG. 3. The term "low flight" as used herein comprises a flight altitude of about 100 ft above ground level or less. Speeds at low flight are generally within a range that enables the sensors to collect data in an efficient and safe manner; example speeds may be speeds within the range of about 0 to 70 knots, depending on the altitude of the vehicle 100. Sensors 140, used to collect data and assess a situation in a low flight scenario 550, project coverage areas 552.

Figure 6:
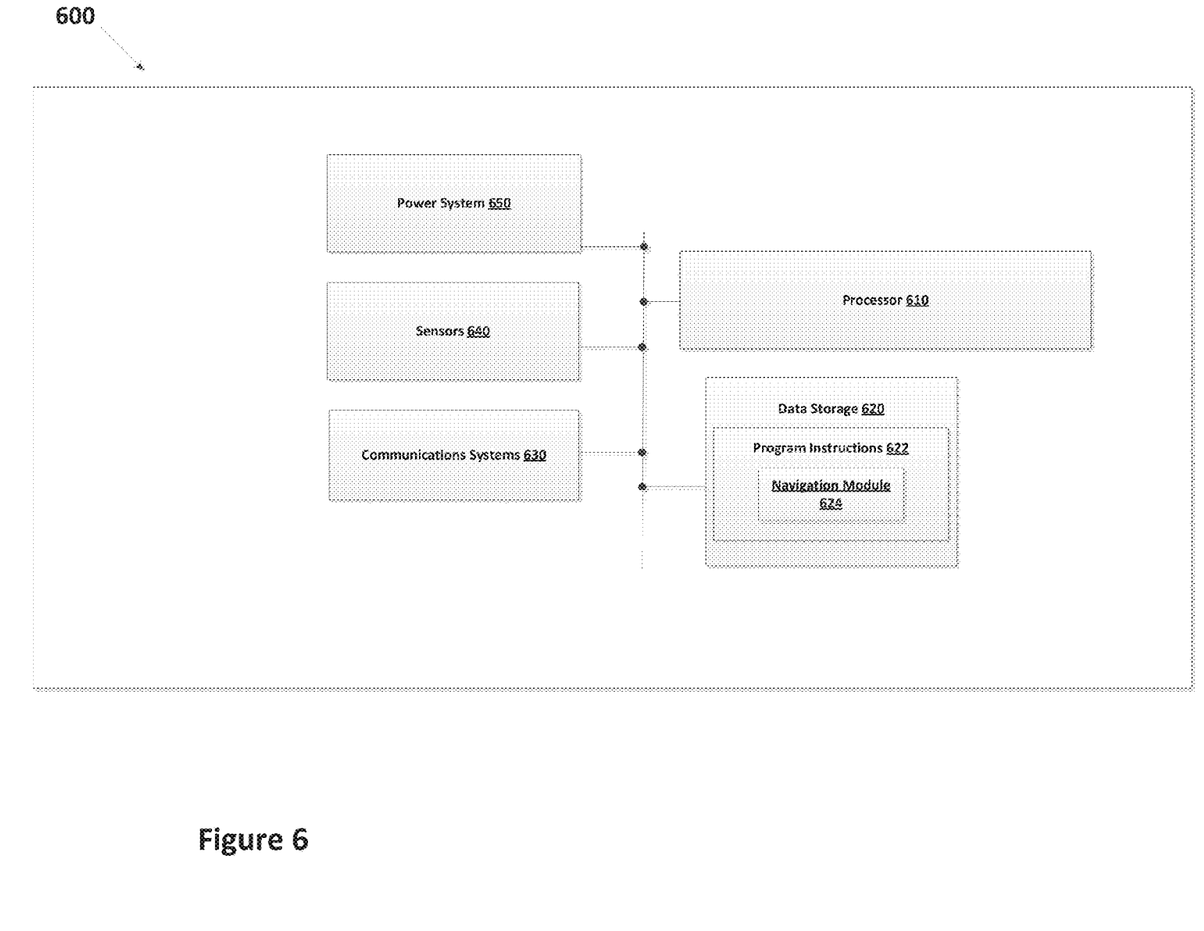
FIG. 6 is a simplified block diagram illustrating components of a vehicle according to an example embodiment.

FIG. 6 is a simplified block diagram illustrating components of a vehicle 600, according to an example embodiment. The vehicle 600 may take the form of or be similar to vehicle 100 of FIG. 1.

Vehicle 600 includes a processor 610. Processor 610 may be a set of one or more processors or may be a multi-processor core, depending on the particular implementation. The processor 610 is configured to execute computer-readable program instructions that may be loaded into data storage 620 and are executable to provide at least part of the functionality of a vehicle, such as vehicle 100 or 600, described herein. For example, the processor 610 may execute instructions to control operations of the vehicle 600 and its components (e.g., one or more of the components described above with reference to vehicle 100 of FIG. 1). The processor 610 may communicate with another processor remotely located from the vehicle 600, forming a control system to control operations of the vehicle 600 and its components. In one example embodiment, the processor remotely located may be a ground station.

Data storage 620 includes one or more computer-readable storage media that may be read or accessed by the processor 610. Data storage 620 may be capable of storing information either on a temporary basis and/or a permanent basis. In another example, data storage 620 may be a random access memory or any other volatile or non-volatile storage device, which may be integrated in whole or in part with the processor 610. Data storage 620 may take various forms depending on the particular implementation. In one instance, data storage 620 may be a fixed or removable hard drive, a flash memory, a rewritable optical disk, a rewritable magnetic tape, or some combination of the above. In one example, a removable hard drive may be used for data storage 620. In addition to including computer-readable program instructions 622, data storage 620 may also include additional data, such as a navigation module 624, for example, for vehicle 600. Thus, data storage 620 may include program instructions to perform or facilitate some or all of the vehicle functionality described herein.

The vehicle 600 includes one or more communications systems 630. Communications systems 630 may include one or more wire or wireless interfaces, allowing the vehicle to communicate via one or more networks. Wireless interfaces may include, for example, wireless communication protocols such as Bluetooth, WiFi, Long-Term Evolution (LTE), WiMAX, a radio-frequency ID (RFID) protocol, near-field communication (NFC), among others. Wired interfaces may include an Ethernet interface, a Universal Serial Bus (USB) interface, a wire, a coaxial cable, a fiber-optic link, or other physical connection to a wireline network. The vehicle 600 may communicate with a processor remotely located from the vehicle 600 via the one or more communications systems 630.

Vehicle 600 also includes various sensors 640. The sensors 640 may comprise one or more of the sensor types discussed with reference to vehicle 100, for example.

The vehicle 600 may also include a power system 650. The power system 650 may include one or more batteries to supply power to the vehicle 600, in one example embodiment.

The different components illustrated for vehicle 600 are not meant to provide architectural limitations to the manner in which different embodiments may be implemented. The different illustrative embodiments may be implemented including components in addition to or in place of those illustrated for vehicle 600. Other components shown in FIG. 6 can be varied from the illustrative examples shown.

The vehicles 100 and 600 are configured to rapidly deploy to and provide assessment of a situation. In the event of a train derailment situation, for example, an unmanned vehicle such as vehicle 100 and vehicle 600 may be sent instructions to deploy to the scene of the emergency situation and transmit data concerning the conditions at the scene. The unmanned vehicle may then navigate to the scene, by flying or driving, or a combination thereof. Once at the desired location, the unmanned vehicle uses one or more of its sensors to obtain data concerning the situation.

In some embodiments, the unmanned vehicle may use a number of its sensors in its initial assessment of the location to obtain as much data as possible: data concerning the environment, determining whether there are any chemical or hazardous substances at the location, data indicating whether there are any obstacles at the location, data indicating whether any railcars have derailed, data identifying railcars by obtaining their code or number, and their contents. After transmitting initial data concerning the situation to either a control system or otherwise in a manner for evaluation by emergency personnel, the unmanned vehicle may be further tasked with providing more specific terrain information to access a desired point at the situation. Thus, the unmanned vehicle communicates with a control system and is autonomously controlled to aid in the initial assessment of a situation, relieving personnel from doing so until the situation conditions are better known. A decision support team may review the transmitted data to help determine the safest route for a team of personnel, for example a HAZMAT team, to approach the situation, contain it, and evacuate any surrounding areas that may be affected.

3. Example Method

Figure 7:
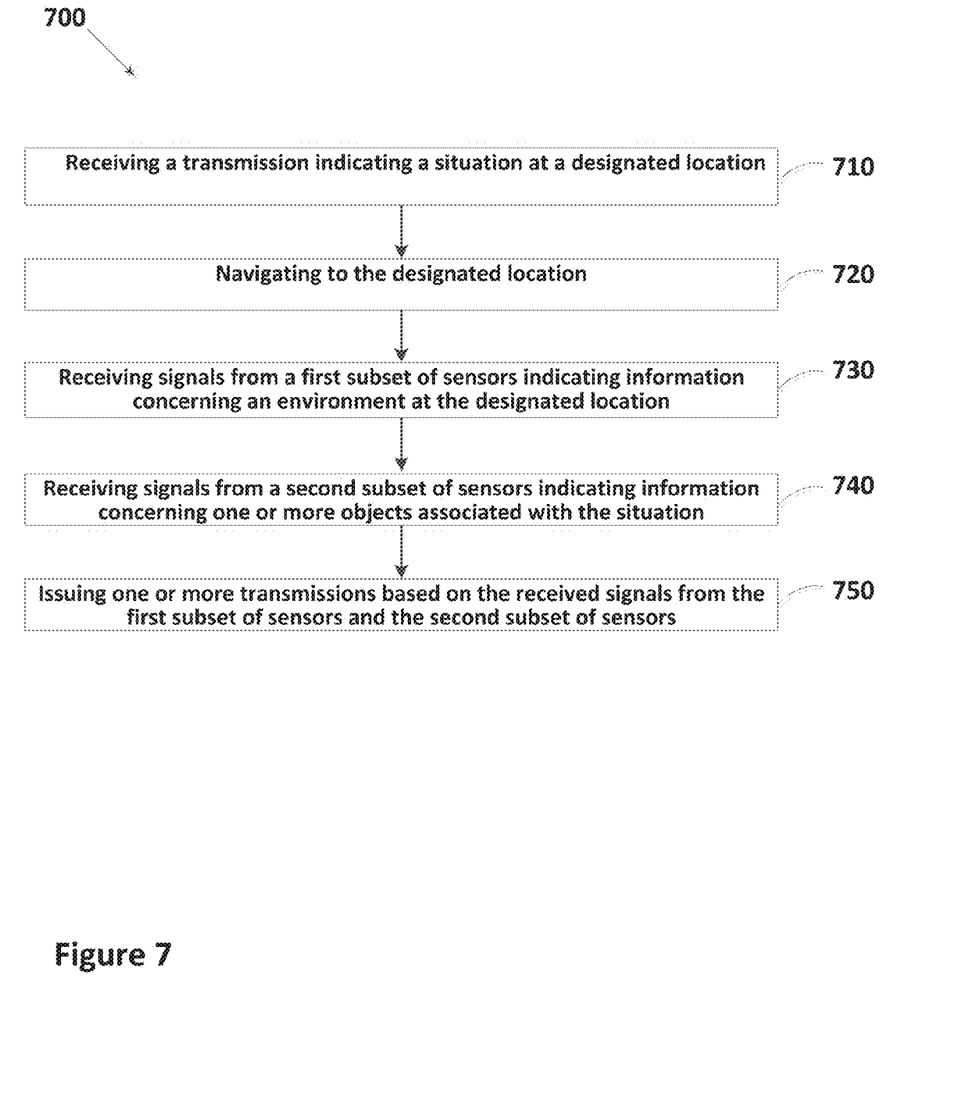
FIG. 7 is a flow chart depicting functions that can be carried out in accordance with an example method.

FIG. 6 is a method 600 that can be carried out in accordance with the present disclosure. Method 600 is a method for assessment of a situation. The situation may be, for example, a derailment of one or more train cars from a train track. In another example, the situation may be an assessment of one or more components of a moving train. In yet another example, the situation may be an accident involving a vehicle on a road or other ground terrain. In another example, the situation may be an accident at a plant, facility, or other building. Still other example situations may be envisioned. Furthermore, the situation may include a critical condition requiring a rapid response to address damage to property, potentially hazardous substance leaks, as well as potential injuries or risk of injury to individuals at the scene of the situation.

As shown in FIG. 7, at block 710, the method involves receiving a transmission indicating a situation at a designated location. A control system may communicate with and send instructions to an unmanned vehicle. For example, the unmanned vehicle may be programmed to deploy to the designated location and to transmit or relay back data regarding a situation at the designated location upon receipt of the transmission indicating the situation at the location.

At block 720, the method involves navigating to the designated location. In response to receiving the transmission indicating the situation at the designated location, the unmanned vehicle may deploy and navigate to arrive at the designated location. The unmanned vehicle may include on-board GPS and other location determination sensors to facilitate the navigation. The vehicle may travel via air or ground to reach the designated location.

At block 730, the method involves receiving signals from a first subset of sensors indicating information concerning an environment at the designated location. Once the unmanned vehicle arrives at the designated location, the first subset of sensors is used to obtain data regarding the environment of the location and surrounding areas. Environmental data may include temperature, wind speed and profile, and terrain, among other data as discussed above. The first subset of the plurality of sensors 140 may include Lidar technology, a Global Positioning System (GPS), an inertial measurement unit, an altimeter, and a proximity detection system, for example. Other sensor types may be envisioned to detect and determine environmental conditions.

At block 740, the method involves receiving signals from a second subset of sensors indicating information concerning one or more objects associated with the situation. If the situation is an accident, for example, the second subset of sensors may identify any targeted object. As discussed above, in the example of a train derailment, a targeted object may be a derailed train car, wherein the second subset of sensors obtains data concerning the identification of the derailed train car and orientation of the derailed train car. The derailed train car may include an identification number or other indicator, which the second subset of sensors may pick up and use to identify the train car. Additionally, the contents within the train car can be determined from identification of the train car. The second subset of sensors may include an automatic equipment identification system, a hot wheel and bearing detection system, and a railcar visible identification reader, for example. Other sensor types may be envisioned as well.

In an example situation in which the unmanned vehicle is deployed in response to receiving an alert from a sensors located along the train track trajectory that a moving train has an overheated component, the unmanned vehicle may scan or image passive tags mounted on the exterior surface of railcars to aid in identification of the railcar with the overheated component.

The method may further include receiving signals from a third subset of sensors indicating a presence of a chemical or hazardous substance and issuing one or more transmissions based on the received signals from the third subset of sensors. The presence of the chemical or hazardous substance may also be mapped across a region within the designated location, and future movement of the substance may be estimated by the unmanned vehicle based on the information concerning the environment and the information concerning the substance. For example, wind speed and wind profile data may be used to estimate where and how fast a chemical or hazardous fluid leak (gas or liquid) will travel. Such information could be valuable to personnel seeking to evacuate individuals in areas surrounding the situation to remove them from potential injury from the substance.

At block 750, the method involves issuing one or more transmissions based on the received signals from the first subset of sensors and the second subset of sensors. The unmanned vehicle may issue transmissions to a control system remote from the vehicle, in one example embodiment. The one or more transmissions may include a report on the environment, weather conditions such as temperature, wind speed and profile, terrain, e.g., geographic features on the ground, including subtle geographic features such as river terraces, small hills and valleys in the ground, and potential obstacles. Transmissions concerning temperature and wind speed may include a last-obtained or most recently obtained temperature and wind speed and/or a plurality of temperatures and wind speed values obtained over a period of time. The one or more transmissions may further include identification of the objects involved in the situation, such as vehicles, train cars, or buildings or other structures. The orientation and contents within the objects, if any, may also be identified and transmitted.

The one or more transmissions may be issued in a continuous manner, such as in real time, to a control system, user interface, or other network. In another example embodiment, the one or more transmissions may issue at periodic intervals, or on command.

Additionally, the vehicle may receive instructions to obtain data concerning one or more areas surrounding the designated location and may then continue to navigate to the surrounding areas, and receive signals from any of the first, second, or third subsets of sensors indicating information concerning an environment, any relevant objects or chemical or hazardous substances in the surrounding areas.

The vehicle may receive instructions to generate potential access paths or to map points of access on data concerning the terrain of the designated location. Such potential access paths or points of access may help personnel determine a quick and safe route to send personnel to provide aid to the situation.

4. Conclusion

Exemplary embodiments have been described above. Those skilled in the art will understand, however, that changes and modifications may be made to these embodiments without departing from the true scope and spirit of the disclosure. The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed:

1. A method for assessing a situation using an unmanned vehicle comprising:
   receiving a transmission indicating a situation at a designated location;
   navigating to the designated location, wherein the unmanned vehicle is a vehicle capable of air and ground travel;
   receiving signals from a first subset of sensors indicating information concerning an environment at the designated location;
   receiving signals from a second subset of sensors indicating information concerning one or more objects associated with the situation;
   issuing one or more transmissions based on the received signals from the first subset of sensors and the second subset of sensors;

receiving instructions to generate potential access paths to provide aid to the situation; and
generating one or more access paths based on the received signals.

2. The method of claim 1, wherein the information concerning the environment comprises information concerning one or more of the following: a temperature, wind speed, wind profile, terrain, and obstacles.

3. The method of claim 2, further comprising:
receiving instructions to obtain data concerning one or more areas surrounding the designated location;
navigating to the one or more areas; and
receiving signals from the first subset of sensors indicating information concerning an environment at the one or more areas surrounding the designated location.

4. The method of claim 1, wherein the information concerning the one or more objects associated with the situation comprises one or more of the following: identification of the one or more objects, orientation of the one or more objects, and aid in determination of any contents within the one or more objects.

5. The method of claim 1, further comprising:
receiving signals from a third subset of sensors indicating a presence of a chemical or hazardous substance; and
issuing one or more transmissions based on the received signals from the third subset of sensors.

6. The method of claim 5, further comprising:
mapping the presence of the chemical or hazardous substance across a region within the designated location.

7. The method of claim 6, further comprising:
estimating future movement of the chemical or hazardous substance based on the information concerning the environment and the information concerning the chemical or hazardous substance.

8. The method of claim 5, wherein the first subset of sensors, the second subset of sensors, and the third subset of sensors are on-board the unmanned vehicle and include one or more of the following: Lidar, multispectral sensors, infrared (IR) sensors, a Global Positioning System (GPS), an inertial measurement unit, an altimeter, a proximity detection system, an automatic equipment identification system, a hot wheel and bearing detection system, and a railcar visible identification reader.

9. The method of claim 1, wherein issuing the one or more transmissions based on the received signals comprises continuously issuing transmissions as the signals are received.

10. The method of claim 1, wherein issuing the one or more transmissions based on the received signals comprises issuing the one or more transmissions to a control system.

11. The method of claim 5, further comprising:
generating a map of the situation, the map including one or more of the following: indications of the ground terrain at the designated location, a location and an orientation of one or more objects at the designated location, and presence and location of a chemical or hazardous substance.

12. The method of claim 11,
wherein generating the one or more access paths comprises avoiding detected obstacles and chemical or hazardous substances.

13. The method of claim 1, wherein the unmanned vehicle is a vehicle further capable of moving on tracks to the designated location.

14. An unmanned vehicle for assessing a situation comprising:

at least one propulsion unit, a first wing, a second wing, and a plurality of wheels connected to a body to power air and ground travel;
a navigation module that provides a navigation process to generate flight-control signals for the unmanned vehicle;
one or more sensor systems connected to the body; and
a non-transitory computer readable medium having stored therein instructions executable to cause the unmanned vehicle to:
receive a transmission indicating a situation at a designated location;
navigate from a launch site to the designated location;
receive signals from a first subset of sensors indicating information concerning an environment at the designated location;
receive signals from a second subset of sensors indicating information concerning one or more objects associated with the situation;
issue one or more transmissions based on the received signals from the first subset of sensors and the second subset of sensors;
receive instructions to generate potential access paths to provide aid to the situation; and
generate one or more access paths based on the received signals.

15. The unmanned vehicle of claim 14, wherein the processor is further configured to:
receive signals from a third subset of sensors indicating a presence of a chemical or hazardous substance; and
issue one or more transmissions based on the received signals from the third subset of sensors.

16. The unmanned vehicle of claim 14, wherein the at least one propulsion unit comprises a propeller rotatable out of a compartment within the body via a connection to the body.

17. The unmanned vehicle of claim 14, wherein the one or more sensor systems include one or more of the following sensors: Lidar, multispectral sensors, infrared (IR) sensors, a Global Positioning System (GPS), an inertial measurement unit, an altimeter, a proximity detection system, an automatic equipment identification system, a hot wheel and bearing detection system, and a railcar visible identification reader.

18. A method for assessing conditions caused by a train accident using an unmanned vehicle, comprising:
receiving a transmission indicating a train accident at a designated location;
navigating to the designated location;
receiving signals from a first subset of sensors indicating information concerning an environment at the designated location;
receiving signals from a second subset of sensors indicating information concerning one or more rail cars associated with the situation; and
issuing one or more transmissions based on the received signals from the first subset of sensors and the second subset of sensors.

19. The method of claim 18, wherein receiving signals concerning the one or more rail cars comprises receiving signals identifying the one or more rail cars and providing an orientation of the one or more rail cars.

20. The method of claim 18, further comprising:
receiving signals from a third subset of sensors indicating a presence of a chemical or hazardous substance;
mapping the presence of the chemical or hazardous substance across a region;

estimating future movement of the chemical or hazardous substance based on the information concerning the environment and the information concerning the chemical or hazardous substance; and issuing one or more transmissions including the received signals, mapped presence, and estimated future movement of the chemical or hazardous substance.

* * * * *